(12) United States Patent
Kelly et al.

(10) Patent No.: US 10,086,320 B2
(45) Date of Patent: Oct. 2, 2018

(54) SCREEN BLOCKAGE MEASUREMENT AND FLOW PERFORMANCE OPTIMIZATION SYSTEM

(75) Inventors: Scott Kelly, Morrison, CO (US); Kenneth Oyler, Winston Salem, NC (US); James Burke, El Segundo, CA (US)

(73) Assignee: JWC Environmental, LLC, Santa Ana, CA (US)

( * ) Notice: Subject to any disclaimer, the term of this patent is extended or adjusted under 35 U.S.C. 154(b) by 1572 days.

(21) Appl. No.: 12/822,733

(22) Filed: Jun. 24, 2010

(65) Prior Publication Data

US 2011/0315638 A1    Dec. 29, 2011

(51) Int. Cl.
     *C02F 1/00*      (2006.01)
     *B01D 33/333*      (2006.01)
     *B01D 33/80*      (2006.01)

(52) U.S. Cl.
     CPC ......... *B01D 33/333* (2013.01); *B01D 33/807* (2013.01)

(58) Field of Classification Search
None
See application file for complete search history.

(56) References Cited

U.S. PATENT DOCUMENTS

| | | | | | |
|---|---|---|---|---|---|
| 4,142,481 | A | * | 3/1979 | Minoza | 123/25 B |
| 5,462,673 | A | * | 10/1995 | Piers | 210/739 |
| 5,681,472 | A | * | 10/1997 | Jonsson et al. | 210/618 |
| 5,893,970 | A | * | 4/1999 | Wood et al. | 210/194 |
| 6,165,370 | A | * | 12/2000 | Heissenberger | 210/741 |
| 6,733,663 | B1 | * | 5/2004 | Simon et al. | 210/104 |
| 7,771,589 | B2 | * | 8/2010 | Kelly et al. | 210/104 |
| 2003/0113167 | A1 | * | 6/2003 | Anderson et al. | 405/119 |
| 2009/0314722 | A1 | | 12/2009 | Kelly et al. | |

* cited by examiner

*Primary Examiner* — Richard C Gurtowski
(74) *Attorney, Agent, or Firm* — Sughrue Mion, PLLC (57) ABSTRACT

An apparatus and method are provided that enable the control of a screening operation based on a calculated screen blockage percentage and the velocity throughput of the screen. The apparatus includes an upstream level detector, a downstream level detector and flume or weir placed downstream of the screen. The apparatus may further include a blockage determination unit which determines the percent screen blockage based on the flow level upstream of the screen and the flow level downstream of the screen.

21 Claims, 8 Drawing Sheets

SCREEN BLOCKAGE MEASUREMENT AND FLOW PERFORMANCE OPTIMIZATION SYSTEM

BACKGROUND OF THE INVENTION

1. Field of the Invention

Apparatuses and methods consistent with the present invention relate to operating a screen in a water or wastewater stream based on calculated screen blockage percentages and the velocity throughput of the screen.

2. Description of the Related Art

Today, with the increased sophistication of processes and treatment, screening devices also need to be more sophisticated, reliable and efficient. Because of the increased level of sophistication of the entire process, the screening devices are relied upon to capture increasingly higher levels of debris from the waste stream.

The move to finer screening has enabled improved downstream processes of a wastewater and water treatment plants, lower levels of solids in storm and combined sewerage outfall, and lower levels of solids in water inlets for cooling and processing. Finer screening results in a headloss increase through the screening device. This headloss is due to the relative open area of the screening device and blockage by debris as the waster or wastewater flows through the device.

Various types of screens are used in a variety of applications including Wastewater Treatment, Industrial Water and Wastewater Treatment, Fresh and Salt Water Intake, Storm Sewage Outfall, Combined Sewage Outfall, Pump Stations, and others. In particular, mechanical screens are designed to collect and remove foreign debris that exists in the influent or effluent flow of various processes.

Screen types can consist of screening media constructed of perforated panels, slotted panels, bars, wire mesh and others. The media is most typically constructed of steel, stainless steel, plastic (UHMW-PE), and others. The screens can be cleaned with spray wash water (cold and/or hot), rotating brushes, stationary brushes, wiper blades, or any combination of these. The screen device can be placed in an open channel, in-tank/vessel installation, in front of a water supply pipeline as well as other installed configurations. Headloss is the measured difference in water level when comparing the downstream side to the upstream side of a Screen Device. Depending on the screening media, each type of Screen Device (i.e. Bar Screen, Drum Screen, Perforated Plate Screen, Mesh Screen, Wedge Wire Screen, Disc Screen, Etc.) has a fixed open area for the influent flow to pass through, relative to the upstream water level. The available open area for flow to pass through the Screen Device is greater when clear of debris. As debris collects and builds on the Screen Device during operation, the available open area for flow to pass diminishes.

In the related art, screens are typically operated using a level sensing system using level sensors. Often a PLC in the screen controller is programmed to calculate the differential between the upstream and downstream water levels to determine when to run the screen. The related art relies on a simple measurement of upstream water level as compared to downstream water level (Differential) to determine when the screen should be activated to clean the debris from it. Often times, this method is tied into a timer to periodically operate the device when differential does not initiate operation within a set time period. These simple systems only signal the need for the screen device to start and continue running but do not continuously calculate the change in blocked area resulting in inefficient and unnecessary running of the screen device. This periodic operation is often based on a predetermined value that is typically chosen after testing the screen under various flow conditions at the site. Flow rate and solids content is widely variable through the course of time rendering the simple method of level differential an inefficient way to determine the need to clean debris from the screening device.

Notably, the related art fails to take into account the velocity of the fluid flow and its impact on screening. As a result, the screening system may allow an excessive solid bypass as larger solids can be forced through the screen openings due to high velocity in view of the screen being cleaned too frequently.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for operating a screening device based on continuously monitoring the change in blocked area of the screen.

According to an aspect of the present invention, a screening system is provided which includes an upstream level detector which detects the flow level upstream of a screen; a downstream level detector which detects the flow level downstream of the screen; and a weir or flume disposed downstream of the downstream level.

According to another aspect of the present invention, a screening system is provided which includes an upstream level detector which detects the flow level upstream of a screen; a downstream level detector which detects the flow level downstream of the screen; and velocity probe which determines the velocity downstream of the screen.

According to another aspect of the present invention, the screening system may include a blockage determination unit which determines a percent screen blockage of the screen based on the flow level upstream of the screen, the flow level downstream of the screen and the calculated volumetric flow.

According to another aspect of the present invention, the screening system may include a response unit which takes an action in response to the percent screen blockage.

The action may include at least one of a initiating of a cleaning cycle of the screen, a changing a speed of the screen, introducing hot or cold water or chemicals into a spray manifold for cleaning the screen, increasing the pressure of spray water in the spray manifold, increasing the flow rate of the spray water in the spray manifold, actuating a cleaning brush on the screen or triggering an alarm.

Additionally, the response unit may take an action based on at least one of the percent screen blockage exceeding a predetermined threshold and a rate of change in the percent screen blockage.

According to another aspect of the present invention, the screening system may also include a velocity determination unit which determines a velocity of the flow through the screen based on the flow level upstream of the screen and the flow level downstream of the screen.

According to another aspect of the present invention, the screening system includes a response unit which takes an action in response to the determined velocity.

The action may be at least one of a initiating of a cleaning cycle of the screen, a changing a speed of the screen, introducing hot or cold water or chemicals into a spray manifold for cleaning the screen, increasing the pressure of spray water in the spray manifold, increasing the flow rate of the spray water in the spray manifold, actuating a cleaning brush on the screen or triggering an alarm.

The response unit may take an action based on the velocity exceeding a predetermined threshold.

Additionally, the velocity determination unit may determine a rate of change in velocity based on a comparison of a first velocity of the flow through the screen and a second velocity of flow through the screen.

The response unit may take an action in response to the determined rate of change in velocity.

The action may be at least one of a initiating of a cleaning cycle of the screen, a changing a speed of the screen, introducing hot or cold water or chemicals into a spray manifold for cleaning the screen, increasing the pressure of spray water in the spray manifold, increasing the flow rate of the spray water in the spray manifold, actuating a cleaning brush on the screen or triggering an alarm.

The response unit may take an action based on the rate of change in velocity exceeding a predetermined threshold.

According to another aspect of the present invention, a method of controlling a screen disposed in a flow within a channel is provided, the method including providing a weir of flume downstream of the screen and determining an upstream level of the flow in the channel upstream of the screen and a downstream level of flow in the channel downstream of the screen; determining a volumetric flow in the channel; determining a percent blockage of the screen or a velocity of flow through the screen based on the upstream level, the downstream level and the volumetric flow.

According to another aspect of the present invention, the method may further include taking an action based on the determined percent blockage or the velocity of the flow through the screen.

The action may be at least one of a initiating of a cleaning cycle of the screen, a changing a speed of the screen, introducing hot or cold water or chemicals into a spray manifold for cleaning the screen, increasing a pressure of spray wash water, increasing a flow rate of spray wash water, actuating a cleaning brush on the screen or triggering an alarm.

According to another aspect of the present invention, the method may further include determining a rate of change of volumetric flow in the channel.

The method may further include taking an action based on the rate of change of volumetric flow through the screen.

The action may be at least one of initiating of a cleaning cycle of the screen, a changing a speed of the screen, introducing hot or cold water or chemicals into a spray manifold for cleaning the screen, increasing a pressure of spray wash water, increasing a flow rate of spray wash water, actuating a cleaning brush on the screen or triggering an alarm.

BRIEF DESCRIPTION OF THE DRAWINGS

The above and/or other aspects of the present invention will be more apparent by describing certain exemplary embodiments of the present invention with reference to the accompanying drawings, in which:

FIG. 8 is a flow chart for explaining a screen control method according to an exemplary embodiment of the present invention; and.

DETAILED DESCRIPTION OF THE EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters.

The foregoing exemplary embodiments are merely exemplary and are not to be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

Screening equipment may be provided with level sensors positioned upstream and downstream of the screen. These sensors are used to measure the water level differential between the upstream side and downstream side. When a predetermined differential is measured by the sensors and calculated by a PLC, the screening device run cycle is initiated to clear the material that is causing the increased differential.

Figure 1A:
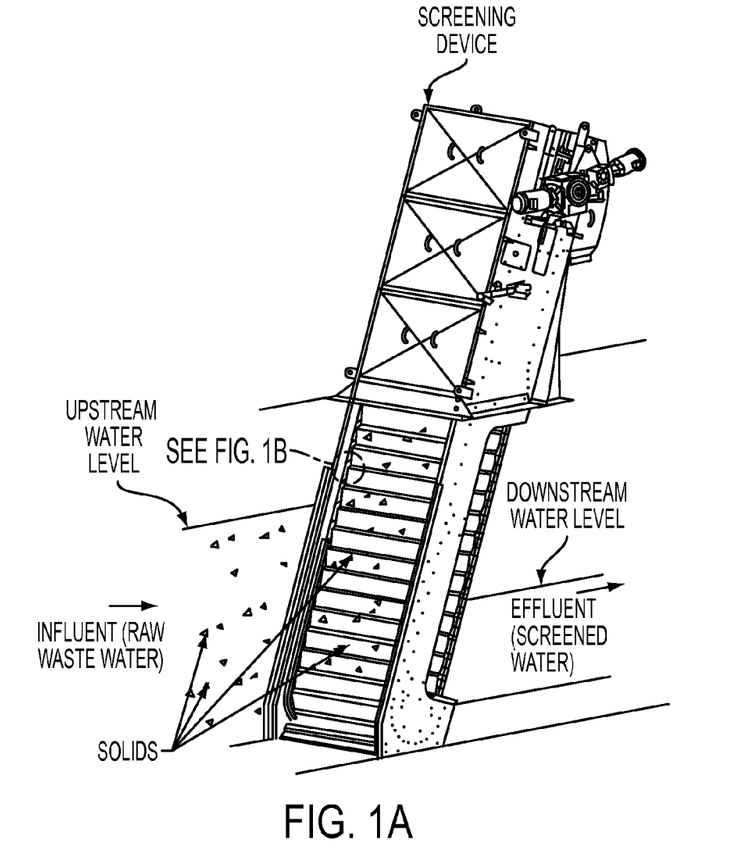
FIG. 1 is a schematic illustrating a moving screen which may be incorporated into the various exemplary embodiments of the present invention.
Figure 1B:
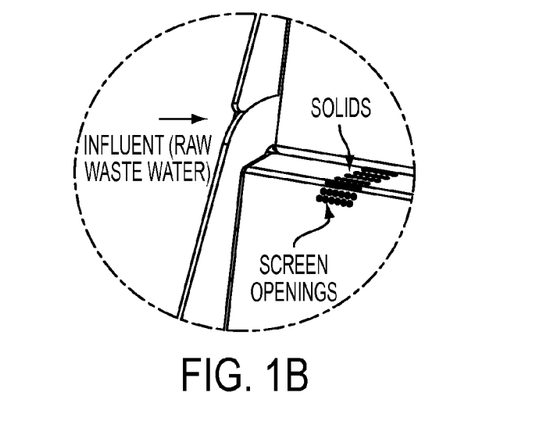

However, according to an exemplary embodiment of the present invention, the control system is designed to constantly monitor the performance of screening devices that are utilized in the capture and removal of unwanted solid waste and debris. This system measures/monitors current operating conditions in a fluid stream to determine the blockage factor of a screening device in comparison to a clean screening device. The screening device may be embodied as either a static screen or as a moving screen which is illustrated in FIG. 1.

The efficiency of a screening device changes as the incoming flow changes. As the flow increases so does the velocity and the amount of debris in the fluid stream. The blockage factor measurement system monitors and takes into account flow rate and velocity in order to prevent the screen from operating too frequently and increasing solids bypass due to having a high flow velocity.

A system according to a first exemplary embodiment is explained below with reference to FIG. 2. This system includes a screening device 1 disposed in a channel 2. In this embodiment, a weir 5 is disposed in the channel 2 downstream of the screening device 1. An upstream flow measuring device, such as a level sensor 4, is disposed upstream of the screening device 1 to measure the height of the flow in the channel 2. Similarly, a downstream level sensor 3 is disposed downstream of the screening device 1 to measure the height of the flow in the channel downstream of the screening device 1.

Figure 5:
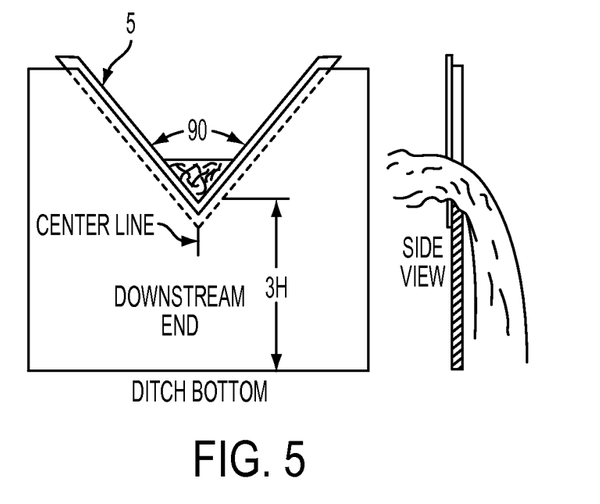
FIG. 5 is an example of a weir.

By placing a weir 5 in the channel downstream of the screening device 1, the downstream level sensor 3 may be used to determine the volumetric flow (Q) of the channel 2. The weir may be of any shape or size as would be recognized by those of skill in the art. The weir may be configured as a simple structure disposed on the bottom of the channel, or alternatively, a rectangular notch weir or a v-notch weir. FIG. 5 shows a v-notch weir having an angle of 90 degrees. The flow rate may be determined using the following equation:

$$Q = 8/15 C_d (2g)^{1/2} \tan \theta h^{5/2} \quad \text{eq. (1)}$$

wherein,
Q—flow rate (volumetric flow)
h—head over weir (e.g., inches)
θ—angle of v-notch
$C_d$—discharge constant of weir
g—32.2 ft/s$^2$ Alternatively, a flow measuring device 7 for measuring the volumetric flow may be disposed in the channel 2. Using this flow measuring device 7, the level of flow downstream of the screen may be determined using eq. (1). In other words, if the volumetric flow and configuration of the weir is known, the level downstream of the screen may be determined without the need for a downstream level sensor 3.

Figure 2:
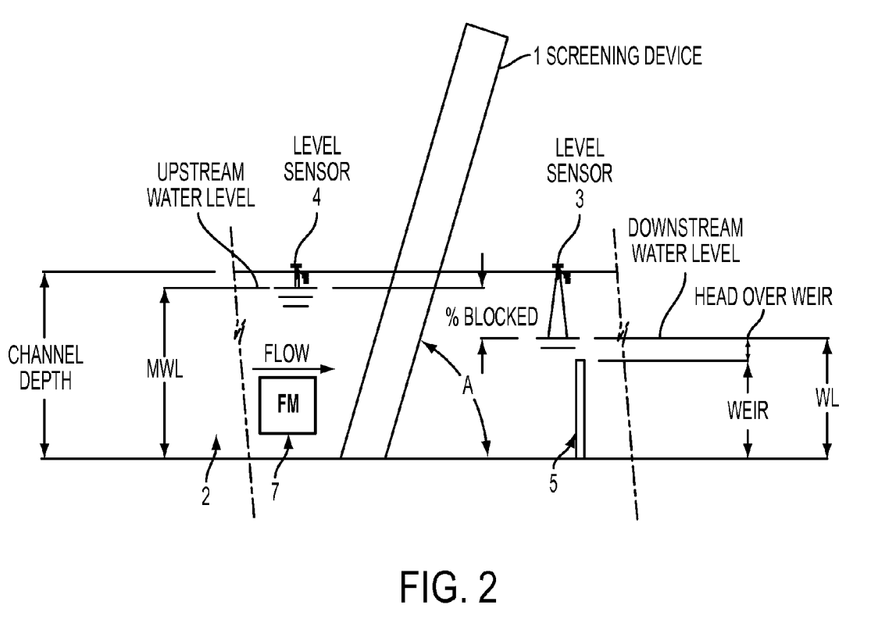
FIG. 2 is an illustration of an exemplary embodiment using a weir.

Another alternative relies on a velocity probe disposed downstream of the screening device 1 as shown in FIG. 2. Such a probe may be used to determine the flow velocity. Further, in combination with the geometry of the channel, the velocity as determined by the velocity probe 8 may be used to calculate the volumetric flow in the channel 2.

While this embodiment is described using a v-notch weir as an example, one of skill in the art would recognize that same effect may be accomplished using rectangular, trapezoidal, sharp crested or proportional weirs.

Figure 3:
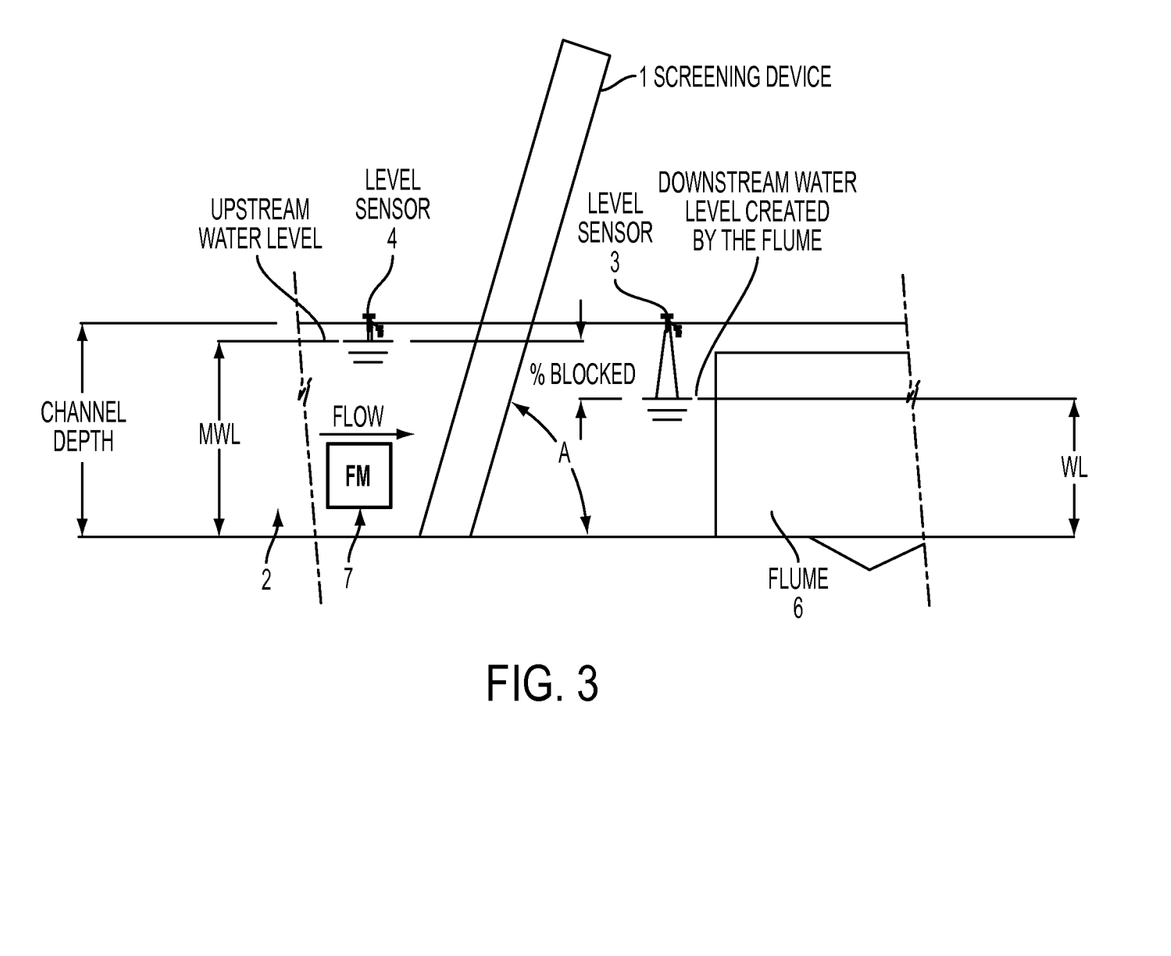
FIG. 3 is an illustration of an exemplary embodiment using a flume.
Figure 4:
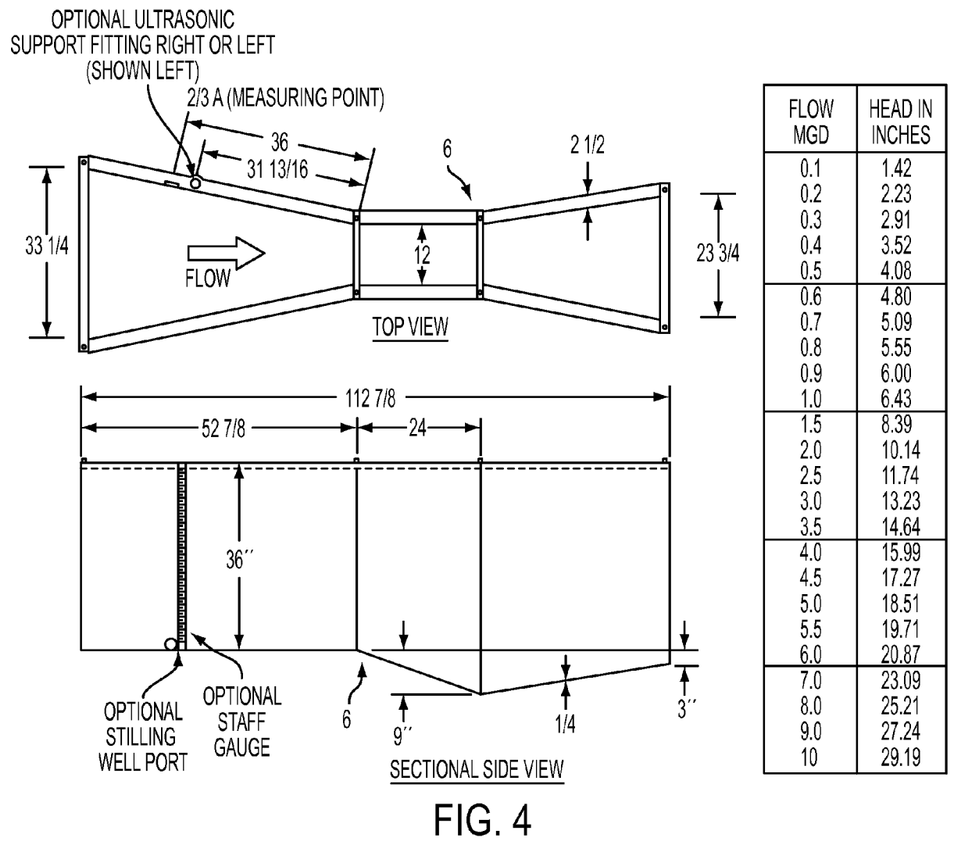
FIG. 4 is an example of a flume.

In another exemplary embodiment as shown in FIG. 3, a flume 6, instead of a weir, may be used in combination with the downstream level sensor 3 to determine the volumetric flow in the channel 2. The flume may be of various shapes and sizes depending on the particular material flowing in the channel and the design of the channel. FIG. 4 shows an example of an acceptable flume configuration associated with a table showing volumetric flow rates with respect to the inches of head upstream of the flume. This head may be detected by the downstream level sensor 3. In a similar manner as described above with regard to the weir configuration, if a flow measuring device 7 is used in the system, the downstream level sensor 3 may not be required as this level may be calculated using the measured volumetric flow and the configuration of the flume 6.

Using any of these configurations, the screen percent blockage may be determined as set forth below.

$$\% \text{ blockage} = 1 - B \quad \text{eq. (2)}$$

$$B = [Q((HL/(k/2g)) + V_c^2)^{1/2}]/A_s \quad \text{eq. (3)}$$

$$V_s = [(HL/(k/2g)) + V_c^2]^{1/2} \quad \text{eq. (4)}$$

$$Q = V_c A_c \quad \text{eq. (5)}$$

$$HL = L_u - L_d \quad \text{eq. (6)}$$

wherein,
Q—volumetric flow in the channel (ft$^3$/s)
$A_s$—open area of clean screen (ft$^2$)
$A_c$—wetted area of channel upstream of screen
k—coefficient of friction of screen
$V_s$—velocity of flow through screen
$V_c$—velocity of flow in channel upstream of screen
$L_u$—level of water upstream of screen
$L_d$—level of water downstream of screen
g—32.2 ft/s$^2$ In summary, the head loss through the screen may be determined based on the difference in water level before and after the screening device 1 calculated using values detected by the upstream level sensor 4 and the downstream level sensor 3. Using this difference in combination with the calculated flow rate or estimated flow rate, the percent blockage and the velocity of the flow through the screen may be determined.

More particularly, the velocity through the screen may be determined using the equations set forth below:

$$V_s = Q/(A_s \times B) \quad \text{eq. (7)}$$

Thus, using the output from the upstream level sensor 4, the output from the downstream level sensor 3 the percent blockage and the velocity through the screen may be calculated. Then, depending on the environment surrounding the screening system, control of the screening operations can be based on either the percent blockage and/or the velocity through the screen.

Figure 6:
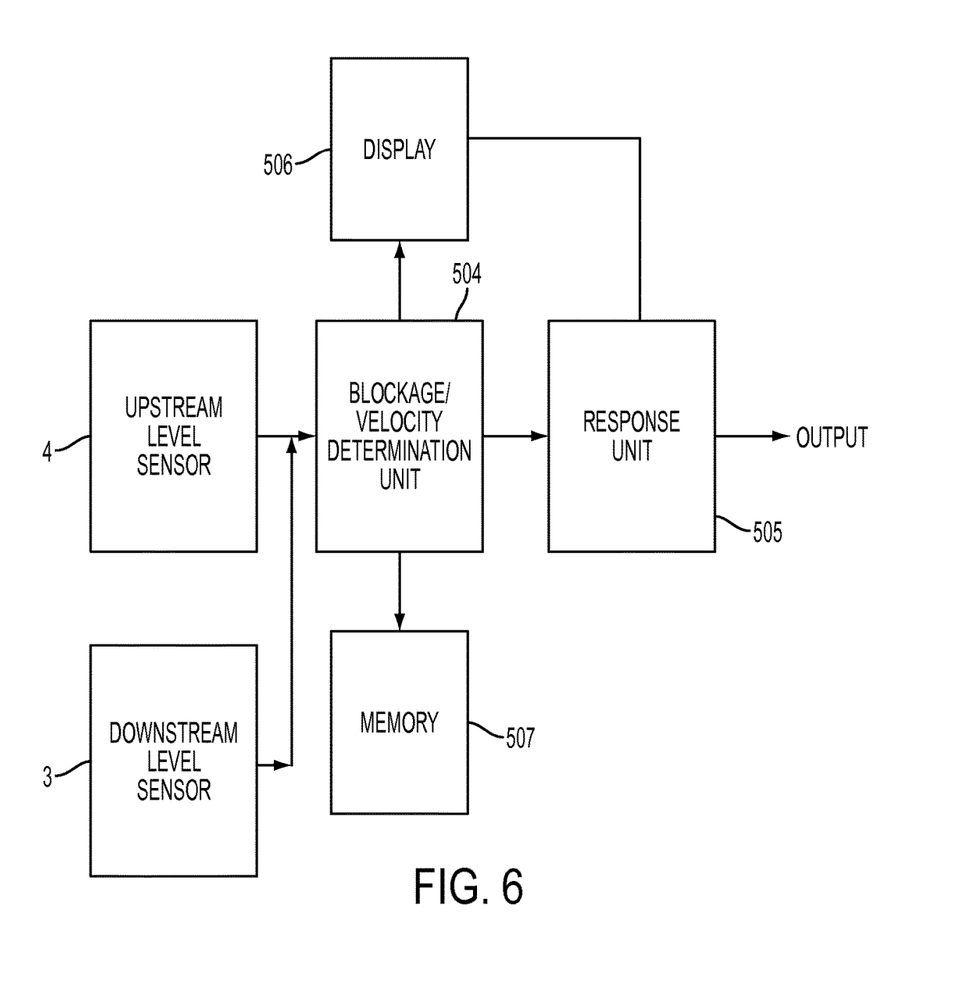
FIG. 6 is a schematic for explaining various inputs and outputs for a screen control system according to an exemplary embodiment of the present invention.

In another exemplary embodiment as illustrated in FIG. 6, based on the equations set forth above, a blockage/velocity determination unit 504 may calculate a volumetric flow based on the downstream level 3 sensor and the weir configuration. In addition, using the upstream and downstream levels from the upstream level sensor 4 and the downstream level sensor 3, the blockage/velocity determination unit 504 determines the blockage or percent blockage of the screening device 1. The blockage/velocity determination 504 may also determine the velocity through the screening device. 1. The blockage/velocity determination unit 504 may be configured to determine either of these values or both. These values may be output to be displayed on a display 506 or may be stored in a memory 507 for future calculations.

The value determined in the blockage/velocity determination unit 504 is then output to the response unit 505. The response unit 505 may be configured to output a signal based on either the determined velocity or the determined blockage percent. The output may be triggered by comparing the determined velocity or the determined blockage percent to a predetermined threshold, or alternatively, by evaluating the rate of change of the determined velocity or determined blockage over a period of time. The output of the response unit 505 may result in the following actions: initiating cleaning cycles, changing the speed of the screening device 1, introducing hot or cold water or chemicals into a spray manifold, increasing the pressure of the spray water in the spray manifold, increasing the flow rate of spray water, actuating a cleaning brush or triggering an alarm. The output may result in a single action or a combination of multiple actions.

Another exemplary embodiment of the present invention is described below. The aspects and features are described hereinafter with reference to flowchart illustrations of user interfaces and methods which may be embodied in and computer program products. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "module", as used herein, includes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 8:
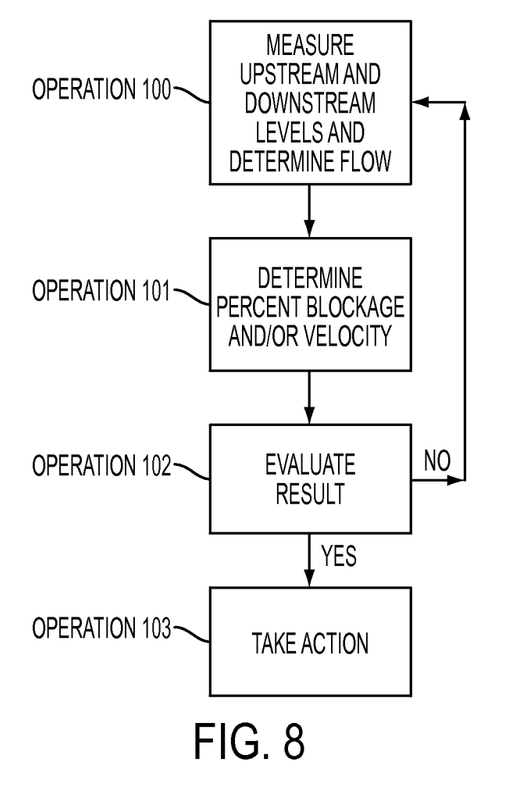

In this exemplary embodiment of the present invention, a method of using the determined percent blockage will be explained with reference to FIG. 8. Initially, the channel flow, the flow level upstream of the screen device and the flow level downstream of the screen device are measured or determined (operation 100). Based on these values, the percent blockage of the screen and/or the velocity through the screen is determined (operation 101). Then, in operation 102, this result is evaluated. For example, the determined screen blockage or the velocity may be compared to a predetermined value in operation 102. Alternatively, the rate of change of the blockage or velocity may be evaluated over time. If the screen blockage or velocity is less than the predetermined value, it may be determined that no action need be taken, and the flow and level values are again monitored for later comparison (operations 100-102). However, if the percent blockage or velocity exceeds the predetermined value in operation 102, subsequent action is taken in response to the percent blockage exceeding the predetermined value (operation 103. Likewise, if the rate of change of the blockage or velocity exceeds a predetermined value, an action may be taken in operation 103.

The action taken in operation 103 may include, but is not limited to, initiating cleaning cycles, changing the speed of the screening device, introducing hot or cold water or chemicals into a spray manifold, increasing the pressure of spray water, increasing the flow rate of spray water, actuating a cleaning brush or triggering an alarm. In response to the comparison in operation 103, a single action or a combination of multiple actions may be taken.

Figure 7:
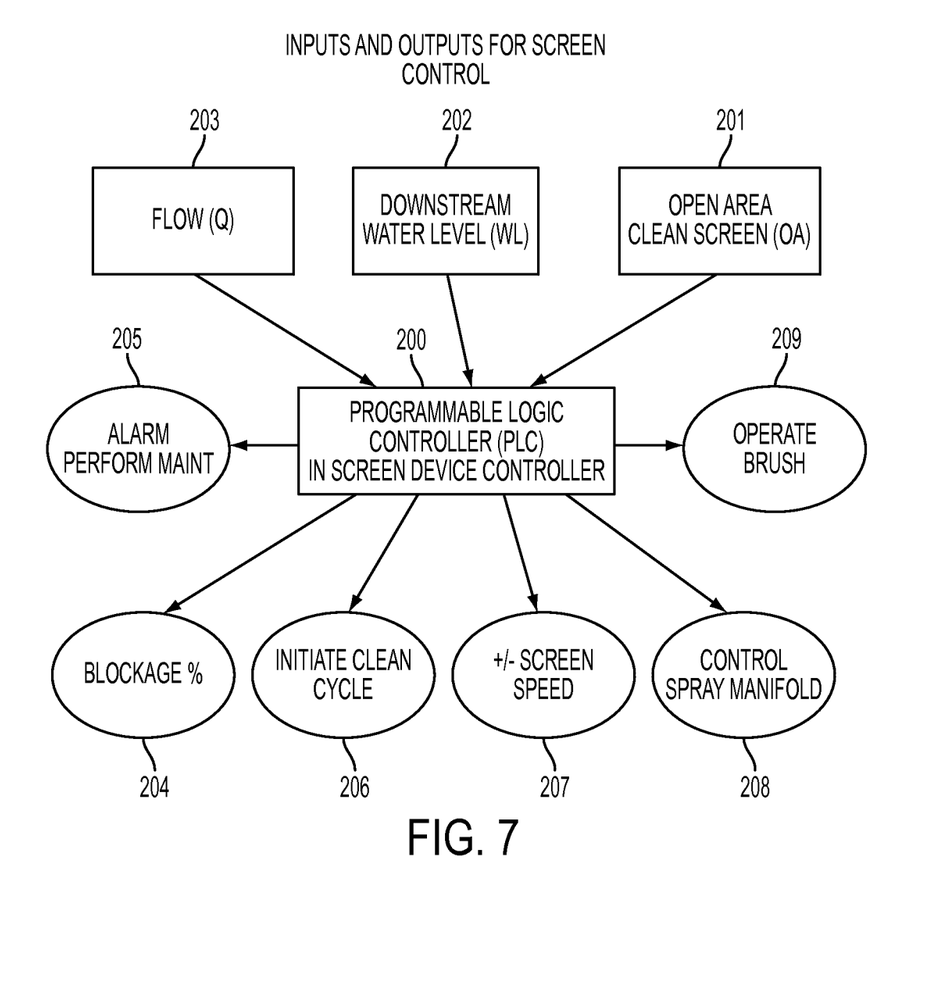
FIG. 7 is a schematic illustrating an exemplary embodiment of the present invention using a programmable logic controller.

According to yet another embodiment illustrated in FIG. 7, this system and methods may be embodied through the control of a programmable logic controller (PLC) 200. In this embodiment, the PLC 200 receives various inputs. These inputs include the initial open area of a clean screen 201, the upstream and downstream water levels 202 and the influent or effluent flow 203. The PLC 200 then determines the percent blockage using, for example, equations (1) through (5) described above. As a result the PLC 200 may output values causing the display of an alarm 205 or the percent blockage 204. The PLC 200 may also be programmed to control a cleaning cycle 206, the screen speed 207, the control of a spray manifold 208 or the operation of a brush for screen cleaning 209.

In summary, based on this blockage factor measurement and/or the screen flow velocity, the system may cause the screen to initiate cleaning cycles automatically, control the speed of the screening device with the use of a multiple speed drive or variable frequency drive (VFD) to maximize the efficiency of the cleaning cycle, automatically introduce hot water and/or chemicals into the spray manifold to assist in the cleaning cycle, increase the pressure or flow rate of the spray water and control the actuation and speed of the cleaning brush to maximize the brush's effectiveness and conserve energy. Pre-set alarm conditions can also programmed into the PLC controller to notify and alarm when abnormal screen blockage has occurred.

Over time, the screening device will become increasingly fouled with debris that cannot be removed by the brushes, wipers and or wash water causing a decrease in the screen's performance. The screen blockage determining system may be used to provide a baseline from which to compare the present cleared screen against the condition when it was first installed. This will increase the frequency of runtime as percent blocked on the cleaned screen degrades. It is important to the operation of any process to keep a screening device as clear of debris as possible to minimize energy consumption, optimize flow, minimize water consumption, extend screen component life, minimize maintenance, and minimize the possibility of influent flow overflowing any upstream process.

The systems and method described above may be configured to provide continuous data collection and calculations that efficiently operate the screen irrespective of flow level and debris content changes throughout the day. These embodiments may detect and cause efficient actions at any water level and with any amount of debris content. Comparative data of the baseline performance of the screen against the cleaned screen performance of the screen provides an early warning system of a potential problem that may not be noticeable to the naked eye. The method can be used to determine if a screening media is more or less blocked than another.

What is claimed is:

1. A screening system comprising:
a channel configured to contain a wastewater flow that includes debris;
a screen disposed in the channel and configured to remove debris from the wastewater flow in the channel;
an upstream level detector which detects a flow level upstream of the screen;
a downstream level detector which detects a flow level downstream of the screen; and
a weir or flume disposed in the channel downstream of the downstream level detector,
wherein the flume comprises a converging portion where a width of the channel decreases and a divergent portion where the width of the channel increases, the divergent portion being disposed downstream of the convergent portion.

2. The screening system according to claim 1, further comprising:
a blockage determination unit which determines a percent screen blockage of the screen based on the detected flow level upstream of the screen and the flow level downstream of the screen.

3. The screening system according to claim 2, further comprising:
a response unit which takes an action in response to the percent screen blockage.

4. The screening system according to claim 3, wherein the action is at least one of an initiating of a cleaning cycle of the screen, a changing a speed of the screen, introducing hot or cold water or chemicals into a spray manifold for cleaning the screen, increasing the pressure of spray water in the spray manifold, increasing the flow rate of the spray water in the spray manifold, actuating a cleaning brush on the screen or triggering an alarm.

5. The screening system according to claim 3, wherein the response unit takes an action based on at least one of the percent screen blockage exceeding a predetermined threshold and a rate of change in the percent screen blockage.

6. The screening system according to claim 1, further comprising:
a velocity determination unit which determines a velocity of the flow through the screen based on the flow level upstream of the screen and the flow level downstream of the screen.

7. The screening system according to claim 6, further comprising:
a response unit which takes an action in response to the determined velocity.

8. The screening system according to claim 7, wherein the action is at least one of an initiating of a cleaning cycle of the screen, a changing a speed of the screen, introducing hot or cold water or chemicals into a spray manifold for cleaning the screen, increasing the pressure of spray water in the spray manifold, increasing the flow rate of the spray water in the spray manifold, actuating a cleaning brush on the screen or triggering an alarm.

9. The screening system according to claim 7, wherein the response unit takes an action based on the velocity exceeding a predetermined threshold.

10. The screening system according to claim 6, wherein the velocity determination unit determines a rate of change in velocity based on a comparison of a first velocity of the flow through the screen and a second velocity of flow through the screen.

11. The screening system according to claim 10, further comprising:
a response unit which takes an action in response to the determined rate of change in velocity.

12. The screening system according to claim 11, wherein the action is at least one of an initiating of a cleaning cycle of the screen, a changing a speed of the screen, introducing hot or cold water or chemicals into a spray manifold for cleaning the screen, actuating a cleaning brush on the screen or triggering an alarm.

13. The screening system according to claim 11, wherein the response unit takes an action based on the rate of change in velocity exceeding a predetermined threshold.

14. A method of controlling a screen disposed in a wastewater flow within a channel, the method comprising:
providing a weir or flume disposed in the channel downstream of the screen, the screen configured to remove debris from the wastewater flow in the channel; and
determining an upstream level of the wastewater flow in the channel upstream of the screen and a downstream level of wastewater flow in the channel downstream of the screen,
wherein the flume comprises a converging portion where a width of the channel decreases and a divergent portion where the width of the channel increases, the divergent portion being disposed downstream of the convergent portion.

15. The method of claim 14, further comprising determining a percent blockage of the screen or a velocity of flow through the screen based on the upstream level and the downstream level.

16. The method of claim 15, further comprising taking an action based on the determined percent blockage or the velocity of the flow through the screen.

17. The method of claim 16, wherein the action is at least one of an initiating of a cleaning cycle of the screen, a changing a speed of the screen, introducing hot or cold water or chemicals into a spray manifold for cleaning the screen, increasing a pressure of spray wash water, increasing a flow rate of spray wash water, actuating a cleaning brush on the screen or triggering an alarm.

18. The method of claim 17, further comprising determining a rate of change of volumetric flow in the channel.

19. The method of claim 18, further comprising taking an action based on the rate of change of volumetric flow through the screen.

20. The method of claim 19, wherein the action is at least one of an initiating of a cleaning cycle of the screen, a changing a speed of the screen, introducing hot or cold water or chemicals into a spray manifold for cleaning the screen, increasing a pressure of spray wash water, increasing a flow rate of spray wash water, actuating a cleaning brush on the screen or triggering an alarm.

21. A screening system comprising:
an upstream level detector which detects a flow level upstream of a screen;
a downstream level detector which detects a flow level downstream of the screen;
a velocity probe disposed downstream of the screen, and
a blockage determination unit which determines a percent screen blockage of the screen based on the detected flow level upstream of the screen, the flow level downstream of the screen and a velocity determined using the velocity probe.

* * * * *